United States Patent
Strack et al.

[11] 3,901,674
[45] Aug. 26, 1975

[54] METHOD OF MAKING OPTICAL FIBER

[75] Inventors: Richard R. Strack, Southbridge, Mass.; Walter P. Siegmund; Merton L. Smith, both of Woodstock, Conn.

[73] Assignee: American Optical Corporation, Southbridge, Mass.

[22] Filed: Mar. 22, 1974

[21] Appl. No.: 453,737

Related U.S. Application Data

[62] Division of Ser. No. 284,813, Aug. 30, 1972.

[52] U.S. Cl. .................. 65/3; 65/4; 65/13; 65/DIG. 7; 117/126 GF; 350/96 WG
[51] Int. Cl.² .......................... C03B 37/02
[58] Field of Search ................. 65/4, 13, 3, DIG. 7; 350/96 WG, 96 B; 117/126 GF

[56] References Cited
UNITED STATES PATENTS

| | | | |
|---|---|---|---|
| 3,278,283 | 10/1966 | Bazinet | 65/4 |
| 3,554,721 | 1/1971 | Gardner | 65/DIG. 7 |
| 3,615,313 | 10/1971 | Phaneuf | 65/4 |

FOREIGN PATENTS OR APPLICATIONS

| | | | |
|---|---|---|---|
| 1,189,265 | 4/1970 | United Kingdom | 350/96 B |
| 1,111,419 | 4/1968 | United Kingdom | 350/96 B |

*Primary Examiner*—Robert L. Lindsay, Jr.
*Attorney, Agent, or Firm*—H. R. Berkenstock, Jr.; William C. Nealon

[57] ABSTRACT

A clad optical fiber having an air space between its core and cladding. The air space allows outgasing of the fiber core and cladding material during fabrication of the fiber and forms an internally reflective interface with the core for transmitting light through the fiber by total internal reflection.

5 Claims, 5 Drawing Figures

PATENTED AUG 26 1975 3,901,674

METHOD OF MAKING OPTICAL FIBER

This is a division of application Ser. No. 284,813, filed Aug. 30, 1972

BACKGROUND OF THE INVENTION

1. Field of the Invention

Fiber optics with particular reference to an improved optical fiber and method of making the same.

2. Description of the Prior Art

A serious problem in fiber optics is the occurrence of blemishes which result from gas bubbles at the core-cladding interface of clad fibers. Such blemishes deflect and/or scatter light outwardly through sides of the fibers and reduce their end-to-end transmission capabilities.

The use of relatively soft cladding materials immediately adjacent to harder fiber core materials as suggested in U.S. Pat. No. 3,653,739, for example, relieve the individual fiber interface blemish problems to some degree but only to the detriment of producing distortion or indentation of adjoining fibers in tight bundles, also explained in U.S. Pat. No. 3,653,739.

A reduction of fiber core blemishing in bundles of fibers having relatively soft claddings can be accomplished by providing air spaces between individual fibers of the bundles as suggested in U.S. Pat. No. 3,653,739. This, however, expands the cross-sectional size of bundles of fibers, per unit number of fibers, and reduces definition of optical images transmitted by the bundles. The loss of image transmission in the air spaces between fibers causes the reduction of image definition and similarly adversely affects image resolution. Accordingly, tighter bundles of optical fibers with less non-image conducting spaces are preferred in the trade and are necessary in certain applications of fiber optic devices.

It is, therefore, a principle object of the present invention to minimize interfacial blemishing in clad optical fibers and image non-conducting spacing in bundles of fibers.

SUMMARY OF THE INVENTION

The objective of this invention is accomplished with a novel optical fiber construction wherein core and outer cladding components of the fiber are slightly spaced apart with minimal contact therebetween for maintaining the spacing. Low refractive index air or gas between the relatively high refractive index core and the outer cladding provides the required internally reflective fiber interface. Furthermore, the spacing permits complete outgasing of core and cladding components without gas bubble entrappment and core-cladding blemishing.

The invention will be more fully understood by reference to the following detailed description when taken in conjunction with the accompanying drawings.

DESCRIPTION OF THE PREFERRED EMBODIMENTS

With reference to the drawings, it can be seen that this invention deals with the manufacture of optical fibers having cores of high refractive index materials surrounded by a media of lower refractive index which produces internally reflective interfaces along the fiber cores, thus making the fibers conductive to light according to the well known principles of total internal reflection. For those interested in details of these principles, reference may be made to one or more of U.S. Pat. Nos. 2,825,260; 3,395,994; and 3,653,739.

It will also become apparent hereinafter that this invention is especially applicable to the manufacture of glass-clad glass optical fibers but not to the exclusion of fibers formed of other materials including fused quartz and optical plastics or synthetics.

Exemplary of the type of fiber making techniques and processes to which the improvement of this invention is particularly applicable are those shown and described in U.S. Pat. Nos. 2,980,957 and 3,037,241 wherein a fiber core material in rod form is placed within a sleeve or tube of fiber cladding material to form an assembly which may be heated and drawn to fiber size.

While vacuum has been applied between rod and tube components of such as the aforementioned prior art assemblies, and special care has been taken for initiating and maintaining cleanliness of external and internal surfaces of the rod and tube components during processing, the entrappment of gases and outgasing of fiber core and/or cladding materials and/or foreign matter thereon during fusion has been found to be unavoidable. Thus, gas bubble interfacial blemishes have heretofore continued to create serious problems of high scrap yield and generally inferior end product results in clad optical fiber production.

Figure 5:
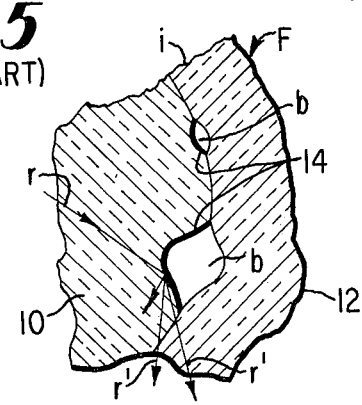
FIG. 5 is a greatly enlarged fragmentary cross-sectional view of a prior art glass-clad glass optical fiber illustrating interfacial defects of the type dealt with and overcome by the present invention.

The blemish problem is illustrated in FIG. 5 of the present drawings for purposes of more clearly illustrating the novel and improved end result of the present invention.

Referring more particularly to FIG. 5, gas bubbles b of various exemplary sizes and shapes are illustrated along interface i between core 10 and cladding 12 of prior art fiber F. These entrapped bubbles b create indentations or depressions 14 in the surface of core 10 which indentations are of irregular shapes and sizes corresponding to the overall bubble shape and size.

As it is well known in the fiber optic art and explained in the aforementioned exemplary U.S. Patents, a smooth internally reflective surface along an optical fiber core 10 is required for optimum transmission of light therealong by total internal reflection. With each incidence of a ray of light against interface i, its continued conductance through fiber F requires that it reflect from interface i within the critical angle of reflection for the particular interface. Thus, for an exemplary ray r (FIG. 5) normally directed toward interface i within the critical angle of reflection, the striking of this ray r against the imperfection of indentation 14 caused by one of gas bubbles b, scatters ray r in directions outwardly of, or beyond the normal critical angle of reflection for interface i. This scattering is depicted with arrows r' representing light rays which become lost through sides of fiber F as stray light thereby diminishing end-to-end transmission of light through core 10 of fiber F.

Figure 1:
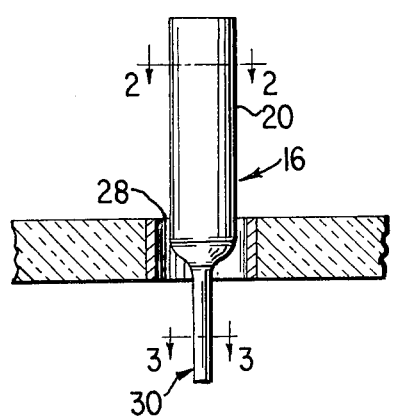
FIG. 1 is a diagrammatic illustration of a method of drawing optical fiber from an assembly of fiber core and cladding materials.
Figure 2:
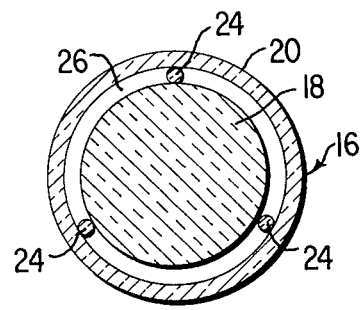
FIG. 2 illustrates a greatly enlarged transverse cross-section of the assembly of materials taken along line 2—2 of FIG. 1 and from which a fiber may be drawn according to the present invention.

According to the present invention, it is contemplated that clad optical fibers be formed by generally conventional assembling and drawing techniques, one of which is diagrammatically illustrated in FIG. 1. Therein assembly 16 includes a central rod 18 (FIG. 2) of a suitable relatively high refractive index light-conducting material (e.g. optical flint glass having a refractive index of approximately 1.75). Rod 18 is supported centrally longitudinally within sleeve 20 having a larger internal diametral size than that of the external diametral dimension of rod 18. This leaves air space 22 between rod 18 and sleeve 20. Spacers 24, preferably in the form of long and slender rods of circular cross-section extending throughout substantially the full length of assembly 16, maintain rod 18 in the aforementioned centered relationship within sleeve 20. Thus, a uniformly dimensioned inner space 26 extends circumferentially about rod 18. The wall thickness of sleeve 20 and diametral thickness of one spacer 24 may, for example, constitute approximately one tenth of the total diametral thickness of assembly 16. Preferably, the thickness of one spacer 24 will constitute considerably less than one half of the total thickness of the sleeve-spacer combination. The number of spacers 24 is preferably the minimum, i.e. three, which are approximately equally circumferentially spaced about rod 18. Each spacer 24 is also preferably circular in cross-sectional shape for the purpose of minimizing the extent of its surface contact with rod 18 and, consequently, maximizing the amount of exposure of rod 18 to air in space 26.

Assembly 16 is suspended in the usual manner above a suitable, preferably annular, heating element 28, heated and drawn longitudinally into fiber 30. Greater details of apparatus and procedure normally used for drawing optical fiber as just described may be found in the aforementioned U.S Pat. Nos. 2,980,957 and 3,037,241.

Figure 3:
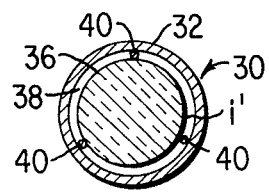
FIG. 3 is a similarly greatly enlarged transverse cross-sectional view of a fiber drawn from the assembly of components shown in FIGS. 1 and 2, the cross-section being taken along line 3—3 of FIG. 1.

Fiber 30, as shown in FIG. 3, comprises the fused combination of all components 18, 20 and 24 in substantially proportionate dimensions and shapes, but all considerably reduced in size. Sleeve 20 and spacers 24, preferably being of identical materials, together produce an outer relatively low refractive index cladding 32 having substantially only line contact with core 34 of fiber 30 thereby providing maximum exposure of outer surface 36 of core 34 to air or gas in space 38 extending therearound. Space 38 corresponds to space 26 in assembly 16 and spacer portions 40 of cladding 32 correspond to spacers 24 of assembly 16. The latter comprise the minimum, i.e. three in number which allow for maximum exposure of core 34 to atmosphere and space 38.

Figure 4:
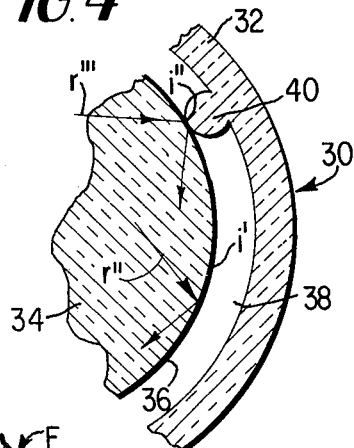
FIG. 4 is a still further enlarged cross-sectional view of a portion of the fiber shown in FIG. 3 diagrammatically illustrating a principle feature of the invention in overcoming prior art problems of fiber core distortion.

Referring more particularly to the greatly enlarged segment of fiber 30 which is illustrated in FIG. 4, it can be seen that air of gas in space 38 which is inherently of a refractive index of 1.00 or at least very close thereto, provides a relatively low refractive index medium around the core 34 of high refractive index material. Thus, interface $i'$ between the air or gas in space 38 and core 34 is highly internally reflective to light rays such as exemplary ray $r''$.

It is particularly pointed out that the surface of core 34 adjoining the air or gas in space 38 retains the initial smoothly finished characteristics of its rod counterpart of assembly 16. It is space 38 which, in addition to forming the aforementioned low refractive index air or glass interface around core 34, allows normally entrapped gases to escape without indenting or otherwise blemishing surface 36 or core 34. At points where spacer portions 40 of cladding 32 join core 34, light rays such as $r'''$ are also normally reflected internally of core 34 for conductance therethrough by total internal reflection from interface $i''$. The low refractive index-to-high refractive index relationship of spacer portions 40 and core 34 respectively produce the internally reflective interface $i''$.

From the foregoing description of this invention, it can be seen that interfacial blemish problems of the prior art resulting from entrapped gas bubbles are avoided and enhanced transmission of light in fiber optic devices is accomplished.

In cases where vacuum tightness of individual fibers or bundles thereof is desired or required, lateral compression of opposite ends of such fibers individually or as bundles may be effected under suitable fusing temperature to seal spaces 38. This has minimal, if any, effect upon light transmission through such fibers or bundles. This sealing of spaces 38 need only extend over only a short portion of the length of the fibers at or adjacent one or both ends or at any point therebetween. Alternatively, however, compression of the fibers or bundles may be avoided and sealing of spaces 38 effected by impregnation with an epoxy resin cement or other suitable sealing agent.

We claim:

1. The method of making a fused completely circumferentially clad light-conducting fiber having core and cladding components spaced apart throughout the major portion of its length and circumference comprising the steps of:

placing a rod of relatively high refractive index light-conducting material approximately centrally within a sleeve of relatively low refractive index material having an inner transverse dimension substantially greater than a corresponding transverse dimension of said centrally disposed rod thereby leaving a space between said rod and sleeve circumferentially about said rod;

placing a plurality of long and thin spacer members longitudinally in said space between said rod and sleeve in widely separated relationship with each other about the circumference of said rod;

heating one end of the entire assembly of said rod, sleeve and spacer members to a fusing and drawing temperature; and drawing said assembly longitudinally to the reduced cross-sectional size of a fiber.

2. The method according to claim 1 wherein said rod, sleeve and spacer members are each formed of glass.

3. The method according to claim 1 further including the step of compressing at least one cross-sectional portion of said fiber radially inwardly sufficiently to close and seal said spacing between said core and sleeve.

4. The method according to claim 1 further including the steps of dividing said fiber into a multiplicity of separate lengths and assembling said lengths together in juxtaposed relationship as a bundle.

5. The method according to claim 4 further including the step of compressing said bundle radially inwardly throughout one cross-section of its length sufficiently to close and seal all spacings within all fibers of said bundle throughout said one cross-section.

* * * * *